June 17, 1930.  G. F. HODKINSON  1,763,783
ZEOLITE WATER SOFTENER
Filed April 6, 1922
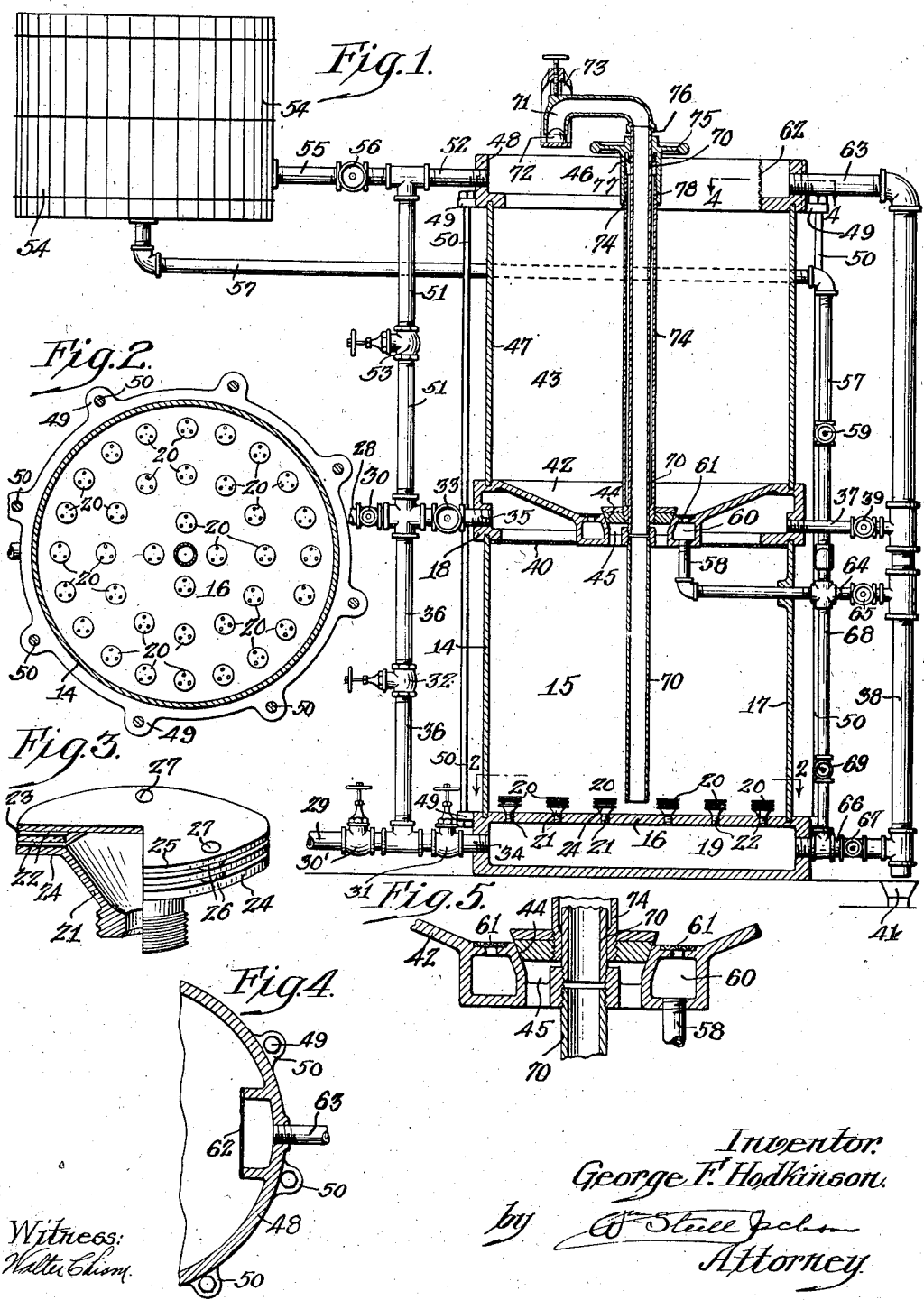
Witness:
Walter Chism.
Inventor.
George F. Hodkinson.
by
Attorney Patented June 17, 1930

1,763,783

UNITED STATES PATENT OFFICE

GEORGE F. HODKINSON, OF PHILADELPHIA, PENNSYLVANIA, ASSIGNOR TO THE PERMUTIT COMPANY, OF NEW YORK, N. Y., A CORPORATION OF DELAWARE

ZEOLITE WATER SOFTENER

Application filed April 6, 1922. Serial No. 550,130.

The purpose of my invention is to more thoroughly regenerate a zeolite bed after it has been used for liquid treatment and preliminary to the next treatment; and to this end I provide a special form of zeolite softener having separate compartments for softening and for regeneration and cleansing, means being provided for intermittent transfer of a charge or body of granular zeolite back and forth between the two compartments. A charge of zeolite remains in the softening compartment until its activity is exhausted to the extent desired. It is then transferred to the other compartment where it is cleansed, regenerated and rinsed. It then goes back to the first compartment with its activity restored.

My invention relates to the processes involved and also to mechanism by which they may be carried out.

I prefer to illustrate my invention by a few forms only among the many by which it might be shown, selecting forms which are practical, highly efficient and inexpensive, and which at the same time well illustrate the principles of my invention.

Figure 1 is a vertical section partly in side elevation of one form of apparatus useful in the performance of my process and within the purview of my invention.

Figure 2 is a section of Figure 1 taken upon line 2—2.

Figure 3 is a perspective partly in section showing one of the strainers of Figure 1.

Figure 4 is a fragmentary section of Figure 1 taken upon line 4—4; and

Figure 5 is an enlarged broken section shown in part in Figure 1.

In the drawings similar numerals indicate like parts.

Zeolites have been used to a considerable extent in the softening of water and this use has constituted so large a part of their utility that the liquid to be treated by the zeolite will be referred to herein generically as water.

In the use of a zeolite filter the zeolite bed is placed within a tank which is closed so as to permit the water to pass through the tank at the normal water pressure. During the water-softening run the zeolite of necessity screens out such foreign matter as the water may contain but primarily acts chemically to exchange bases with chemicals in the water, such, for example as calcium carbonate, substituting the calcium of the carbonate for the sodium of the zeolite and the sodium of the zeolite for the calcium of the carbonate, so that the new compound formed in the water is not a hardening constituent. The zeolite is then back-washed to remove these mechanical impurities and is regenerated by the passage of a solution of common salt through it with subsequent washing to remove the salt. The zeolite is then ready for another run.

While back-washing has the effect of partially loosening up the bed of zeolites it does not thoroughly break up material which is matted and this material, when it has settled back, resists water flow through it and promotes channelling. Back washing removes loosely lodged foreign matter but does not cleanse the zeolite sufficiently preparatory to regeneration and much of the foreign matter adheres to the zeolite, coating the grains in such a way as to prevent access of the regenerating chemical to the coated portions of the grains retarding and preventing proper regeneration. The frequency of channelling and the coating have contributed to the considerable loss in efficiency of a zeolite which has been regenerated.

I provide not only for a much more complete intermixing of the zeolite grains preparatory to regeneration but for scouring the grains and secure much more thorough cleansing of the zeolite, with or without "back washing", by forcing the zeolite into a separate compartment by a flow of water, preferably into an open compartment, where it falls into a body of rinse water. The foreign matter freed from the grains by the stirring up and scouring of the zeolite passes off with the overflow of this water. I also secure the considerable advantage of performing this operation as well as regeneration in the tank open to inspection.

I find that the hydraulic handling of a charge of zeolite and its transfer to a separate regenerating tank are much more beneficial for cleansing and restoration of the grains to their original condition and efficiency than is mechanical or air agitation or back washing.

The apparatus shown in Figure 1 comprises a pair of superimposed tanks with a transverse septum 18; this septum acting as the top of the lower tank and as the bottom of the upper. The lower section is composed of a base 16, cylindrical side wall 17 attached thereto and a closed top 18, this forming the septum between the two tanks referred to. These elements are rigidly united and are adapted to receive and treat water under pressure. Base 16 is chambered, the chamber 19 forming a manifold for inlet water where softening is to be done upward and for outlet softened water with downward softening. The manifold is connected with the interior of the softener through a large number of inlet—or outlet—strainers 20 comprising each a threaded conical connecting member 21 inserted within holes in the bottom of the softener and communicating with the softener through narrow annular spaces 22 formed between one or more annular members 23 and between these annular members and the flange 24 upon member 21 and the top plate 25. The spacing of the parts is determined by washers 26 located between them and held in place by bolts or rivets 27 passing through the washers to hold the parts together.

Either pipe 28 or pipe 29 may provide the inlet water and the other the outlet, depending upon the preferred direction for softening. The piping connections are given added flexibility for control to accomplish any of the functions outlined by valves 30, 30', 31, 32 and 33 controlling connection with pipes 34 and 35 and by-pass 36. The upper pipe 28 is preferably the influent and the lower, 29, the effluent.

The waste water connection for the tank 15 is shown as comprising a pipe 37 connected to the waste pipe 38 through a valve 39 and screened from the tank as at 40 to prevent zeolite waste. The pipe 38 is shown as emptying into a sewer connection 41.

The apparatus shown allows operation in many different ways. Softening can be in either direction and many other permutations are possible. However, in all cases the use of a charge in softening and its cleansing and regeneration are performed in separate compartments. It is necessary in dealing with water under pressure to have the lower compartment shown closed; but there are advantages in having the upper compartment open at the top as this permits inspection and access to the charge.

The use of a separate compartment for regeneration of the zeolite ensures a thorough scouring and cleansing of the zeolite during the transfer of the zeolite from the softener to the regenerating tank and the more complete removal of the regenerating salt from the zeolite during the replacement of the zeolite within the softener.

In the form shown in the Figures 1–5 the regenerating tank is closely coupled with the softening tank by placing the former directly above the latter so that the conical bottom 42 of the regenerating tank 43 forms a partition wall between the two compartments, to guide the contents of the upper compartment toward the valve 44 at the center. When this is lifted and water is admitted the contents of the upper compartment will be washed through valve opening 45 into the lower compartment.

The upper compartment is preferably open at the top at 46, has a cylindrical side wall 47 and is capped by a ring 48. The ring and base are provided with ears 49 for tie rods 50, offering one of various convenient ways of holding the parts tightly together.

The pipes 28 and 29 are connected to supply water to the regenerating compartment by pipes 51 and 52 controlled by valve 53.

When the valve 53 is closed the connection at 52 may be used for insertion of a regenerating solution, preferably a solution of common salt, from a tank 54, through pipe 55, controlled by valve 56. The salt solution may also be connected, as through pipes 57, 58 controlled by valve 59 with the bottom of tank 43. Admission to the bottom of the tank is preferably made through a distributor 60 having screened communication at 61 with the bottom of the tank 43.

Wash water outlet from the upper compartment may be had at the top through screen 62 and pipe 63 in communication with the waste pipe 38. When it is desired to wash downwardly the connection may be made from the lower part of compartment 43 to the waste pipe by the pipe 58 and a pipe 64 controlled by valve 65.

The contents of chamber 15 can be washed downwardly also through the manifold 19 and a connection 66 to waste pipe 38. The connection is controlled by a valve 67.

Pipes 57, 58 and 64, already seen to be in communication, are connected also by a pipe 68 with the manifold 19. This connection is controlled by a valve 69.

The entire zeolitic content of compartment or chamber 15 may be driven hydraulically through a pipe 70 and nozzle 71 connecting the lower part of the filter with the top of the regenerating tank. The zeolite there discharges into a chamber filled with rinse water so that the water may thoroughly wash the zeolite and any foreign matter in it is floated out along with the overflow (pipe 63) of water displaced by the zeolite. The nozzle may be closed by a valve 72 held in place by a screw clamp 73.

Pipe 70 passes through the valve 44 and is surrounded by a pipe 74 which comprises the stem of the valve 44 and which can be lifted in any suitable and well known manner by turning a wheel 75. The wheel is supported in any suitable manner so that its rotation results in the lifting of the pipe 74. This is normally accomplished by supporting the pipe 70 separately and mounting upon it collars 76 and 77 between which the wheel turns, preventing the longitudinal movement of the wheel while the threaded sleeve 78 connected with the wheel screws upon the stem 74 to lift or lower the valve.

In operation the zeolite is placed within the softener tank 14, valve 32 is closed and the raw water is run through the zeolitic bed either upwardly or downwardly until the zeolite has exchanged its base for that of the hardening constituent of the water to such an extent as to need regeneration. To wash with raw water the valves 30', 33 and 53 must be closed. Water is injected into the softener at the bottom through valves 30, 31 and 33 to force the content of zeolite upwardly through the pipe 70 into the regenerating tank, during which movement the grains are thoroughly separated and scoured. Soft water can be used, taken from pipe 29, through valves 30' and 31 and valves 32 and 33 would be closed. If the lower connection be the inlet, the connections will be the reverse of those given above.

The loosening of the foreign matter from the zeolite, accomplished by the thorough scouring during its passage from the softener to the regenerating tank, discharges the zeolite into a body of water in the most favorable condition for complete cleansing, with the foreign matter loose and the surfaces of the zeolite thoroughly cleansed and exposed for more effective regeneration. The zeolite settles quickly through the water to the bottom and the impurities pass out with the overflow of displaced rinse water.

Regeneration can take place in either direction, by salt water from the tank 54 passing in at the top or bottom as preferred. If at the top it passes in through pipe 55, valve 56 and pipe 52 and wash outlet at the bottom takes place through pipes 58 and 64 and valve 65, the valves 53, 59 and 69 being closed.

If regeneration is to take place from the bottom, the salt solution will pass in through pipe 57, valve 59 and pipe 58, valves 65 and 69 being closed; and wash outlet will take place at the top through screen 62 and pipes 63 and 38.

The salt water is then washed out by passing water through the bed as it lies, inlet taking place through pipes 51 and 52 if it is to be washed downwardly and through manifold 19 and pipes 68 and 58 if the washing take place upwardly.

Before replacement of the zeolite, the zeolite tank 47 is filled with water, the valve 44 is raised and the zeolite falls into the rinse water of the softener tank, again rinsing the regenerated zeolite and displacing the rinse water, which passes out through the waste pipe 37.

Obviously when the zeolite is discharged from the softener tank it may be discharged into a somewhat more dense salt solution for regeneration instead of into clear water, if the regenerating tank 47 be filled from the salt supply instead of from the fresh water supply.

If the salt solution be used, the regeneration is concurrent with the initial rinsing and the overflow from the salt solution flushes out liberated foreign matter which has been disengaged from the zeolite grains, after which the wash water is admitted to remove the surplus salt remaining from the salt solution.

As soon as the zeolite has been regenerated it may, if desired, be dropped into the compartment 15 since it there falls into and settles through rinse water which would have the effect of cleansing the regenerated zeolite of surplus salt solution, washing the salt solution out through the pipe 37 along with the water displaced by the zeolite. However, as indicated, I prefer to wash the regenerated zeolite in the regenerating tank.

When the valve 44 is lifted and the regenerated zeolite passes down into the softener drum the zeolite redistributes as a bed ready for another run and the operation described may be repeated.

The disturbance resulting from the discharge of the zeolite into the water prevents rapid settling of the zeolite and results in nearly even distribution. Any tendency to pyramid in this or in my other forms can be taken care of readily by momentary back washing.

Having thus described my invention, what I claim as new and desire to secure by Letters Patent is:—

1. In processes of softening water by a pervious body of zeolites, said body being successively used in softening, cleansed, regenerated and rinsed, the process which comprises exposing a pervious body of zeolite to a flow of hard water in one compartment until its activity lessens substantially, then transferring it to another water-filled compartment by a flow of water, the transferred zeolite being allowed to fall through said water, thereby cleansing said zeolite, removing the water, regenerating with a flow of salt solution, rinsing and returning the charge of zeolite to the first compartment for renewed use.

2. In water softening apparatus, a tank-like container divided into an upper and a lower compartment by a transverse septum having a closable aperture, pipe means extending from a low point of the lower compartment to a high point of the upper compartment and adapted for hydraulic transfer of zeolites from the lower compartment to the upper compartment, a hard water inlet and a soft water outlet for the lower compartment, a brine inlet and outlet for the upper compartment, and means for opening the closure in the septum to permit return of zeolites from the upper to the lower compartment.

3. In the apparatus of claim 2, an upper compartment having an open top.

4. In apparatus for softening water, a tank divided into upper and lower compartments by a transverse funnel-shaped partition having an opening at its approximate center, an adjustable closure for said opening, a hydraulic conveyor communicating with the bottom of the lower compartment and the top of the upper compartment, means for passing hard water into and soft water out of the lower compartment, means for supplying and removing brine and wash water to the upper compartment and means at the top of the upper compartment for opening said closure.

GEORGE F. HODKINSON.